(12) United States Patent
Enomoto

(10) Patent No.: US 6,324,017 B1
(45) Date of Patent: Nov. 27, 2001

(54) ZOOM LENS SYSTEM AND A FOCUSING METHOD THEREOF

(75) Inventor: Takashi Enomoto, Chiba (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,353

(22) Filed: Dec. 22, 1999

(30) Foreign Application Priority Data

Dec. 24, 1998 (JP) .................................................. 10-368174

(51) Int. Cl.⁷ .................................................. G02B 15/14
(52) U.S. Cl. .................. 359/680; 359/683; 359/686; 359/689; 359/691
(58) Field of Search ....................................... 359/686, 689, 359/683, 691, 680

(56) References Cited

U.S. PATENT DOCUMENTS

| | | |
|---|---|---|
| 4,196,969 | 4/1980 | Itoh ........................................ 359/680 |
| 4,813,773 | 3/1989 | Minefuji ................................ 359/679 |
| 4,936,661 * | 6/1990 | Betensky .............................. 359/692 |
| 5,061,053 | 10/1991 | Hirakawa ............................. 359/690 |
| 5,270,866 | 12/1993 | Oizumi et al. ....................... 359/689 |
| 5,455,714 | 10/1995 | Kohno .................................. 359/689 |
| 5,574,599 | 11/1996 | Hoshi et al. ......................... 359/689 |
| 5,666,229 | 9/1997 | Ohtake ................................. 359/683 |
| 5,815,320 | 9/1998 | Hoshi et al. ......................... 359/686 |

* cited by examiner

Primary Examiner—Georgia Epps
Assistant Examiner—Michael A. Lucas
(74) Attorney, Agent, or Firm—Greenblum & Bernstein, P.L.C.

(57) ABSTRACT

A zoom lens system including a negative first lens group, a positive second lens group, and a negative third lens group, in this order from the object, and thereby upon zooming, the three lens groups independently move along the optical axis. On the other hand, upon focusing, the first and second lens groups, which move independently upon zooming, move integrally along the optical axis.

6 Claims, 16 Drawing Sheets

FNO=5.2 d line
----- g line
---- C line

-1.0  1.0
SPHERICAL
ABERRATION

CHROMATIC
ABERRATION

W=36.3°

-0.05  0.05
LATERAL
CHROMATIC
ABERRATION

W=36.3°

— S
-- M

-1.0  1.0
ASTIGMATISM

W=36.3°

-5.0 % 5.0
DISTORTION

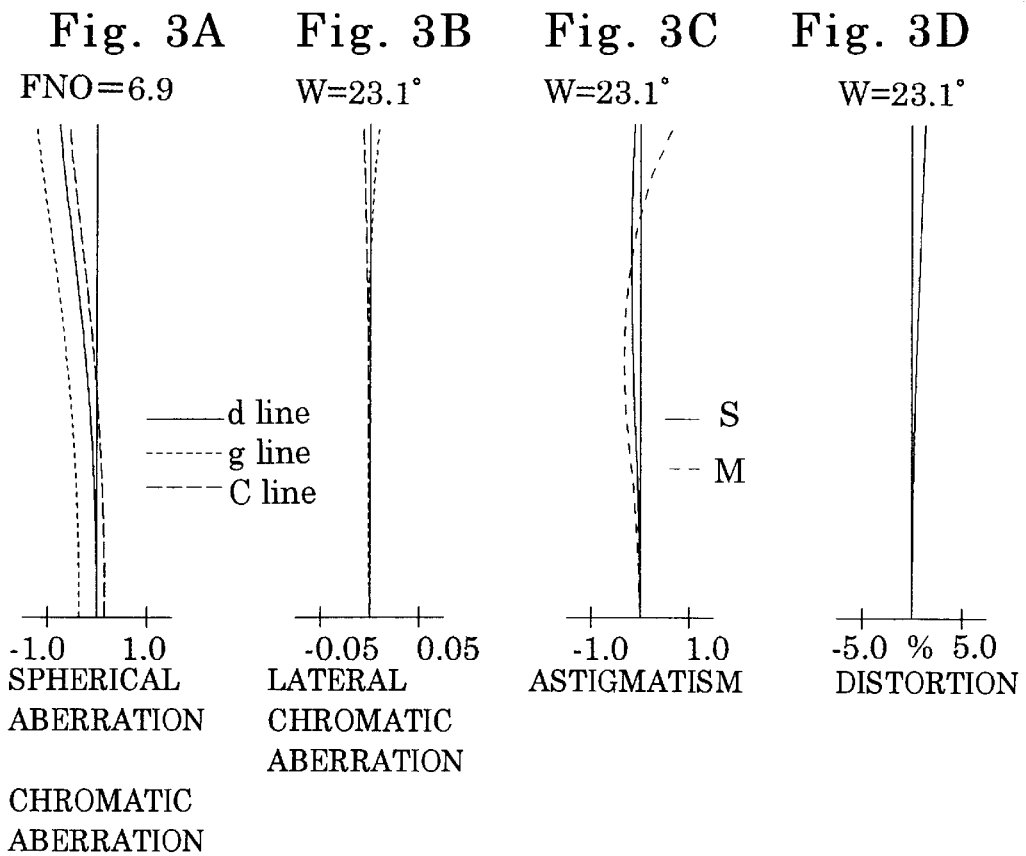
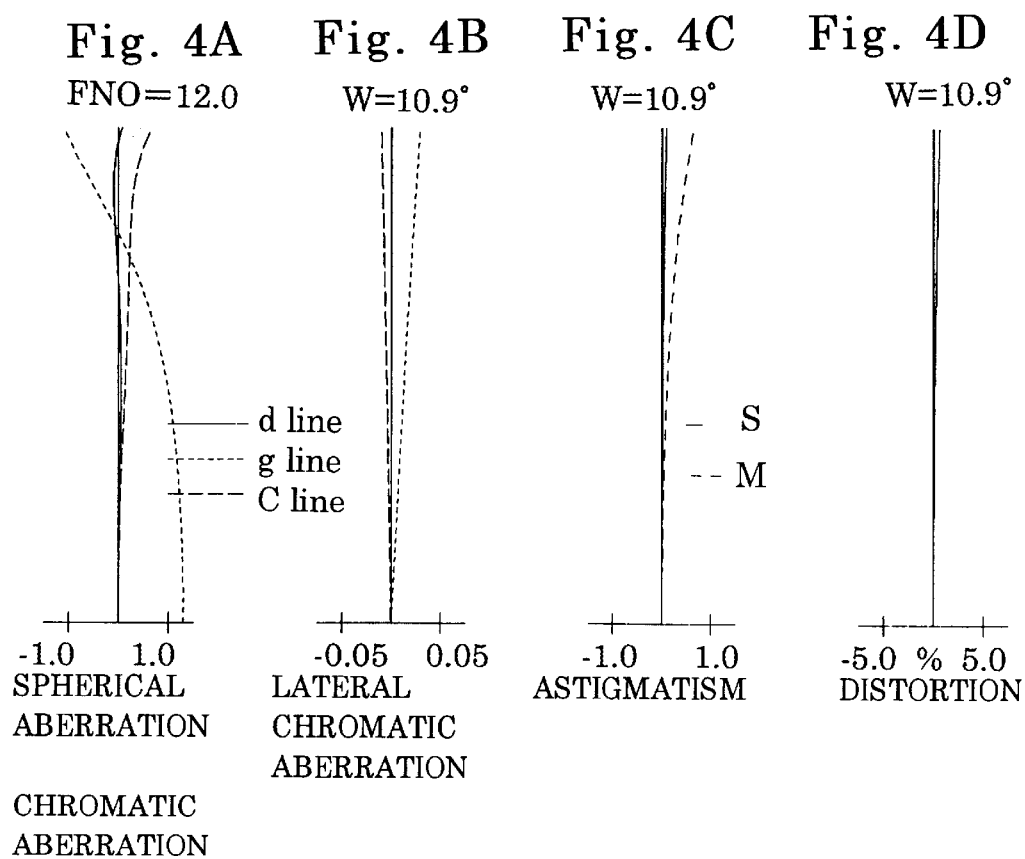

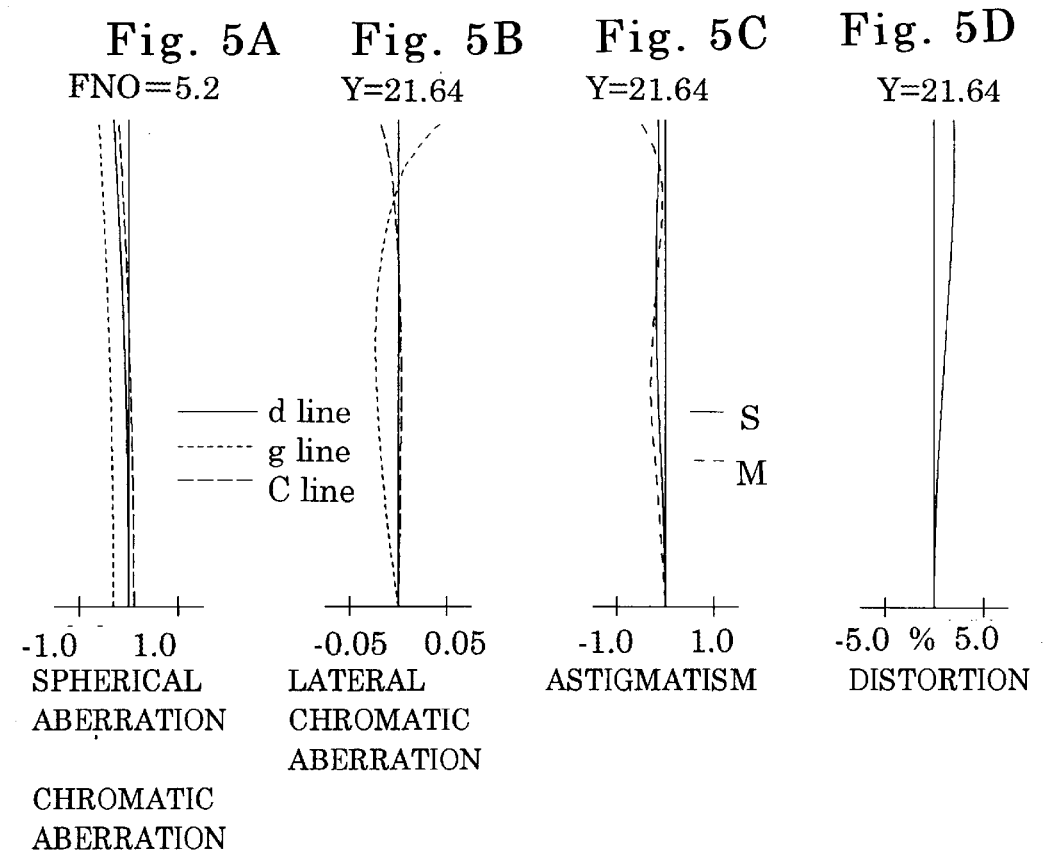
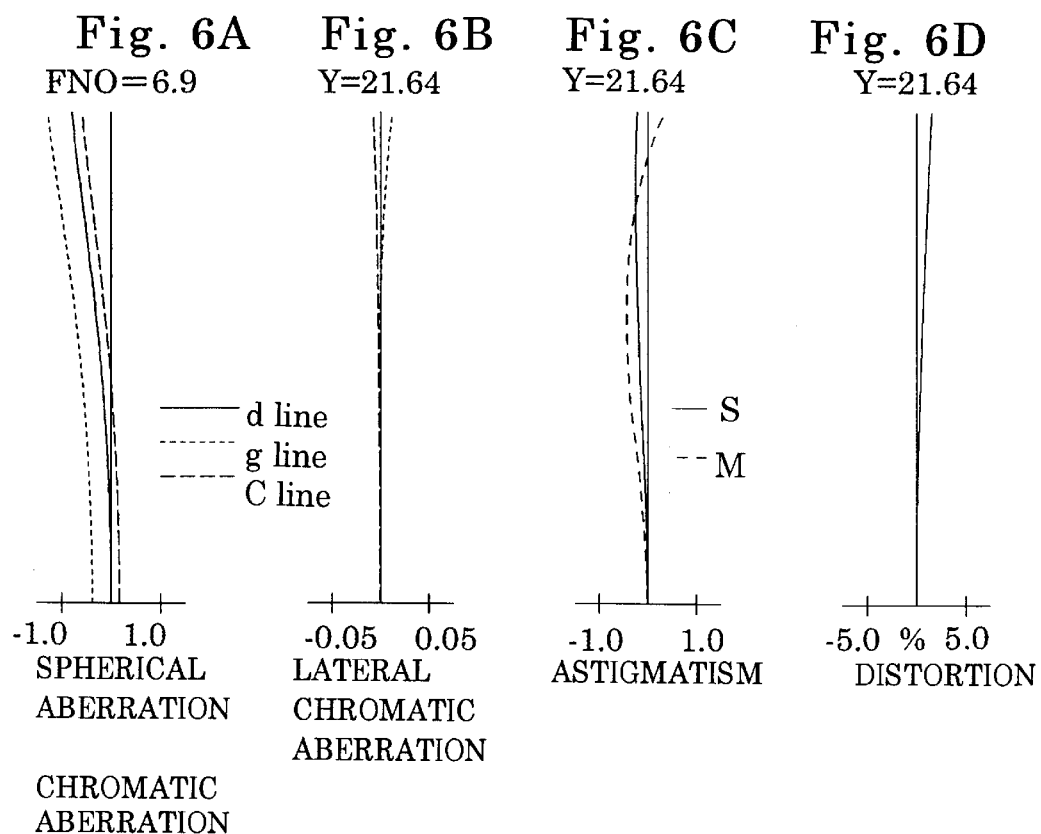

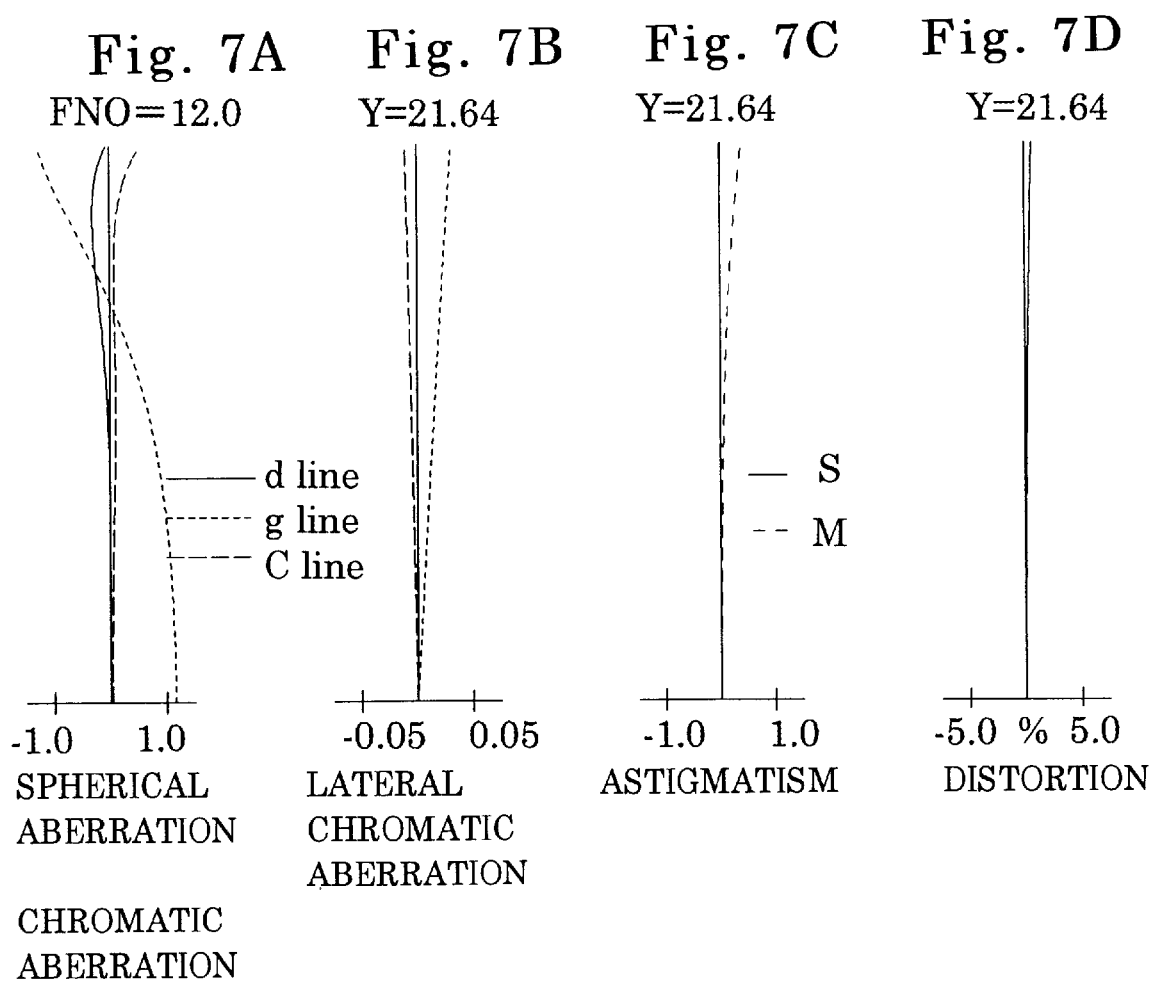

FNO=5.2

W=36.4°

W=36.4°

W=36.4°

— d line
----- g line
---- C line

— S
-- M

-1.0   1.0
SPHERICAL
ABERRATION
CHROMATIC
ABERRATION

-0.05   0.05
LATERAL
CHROMATIC
ABERRATION

-1.0   1.0
ASTIGMATISM

-5.0 % 5.0
DISTORTION

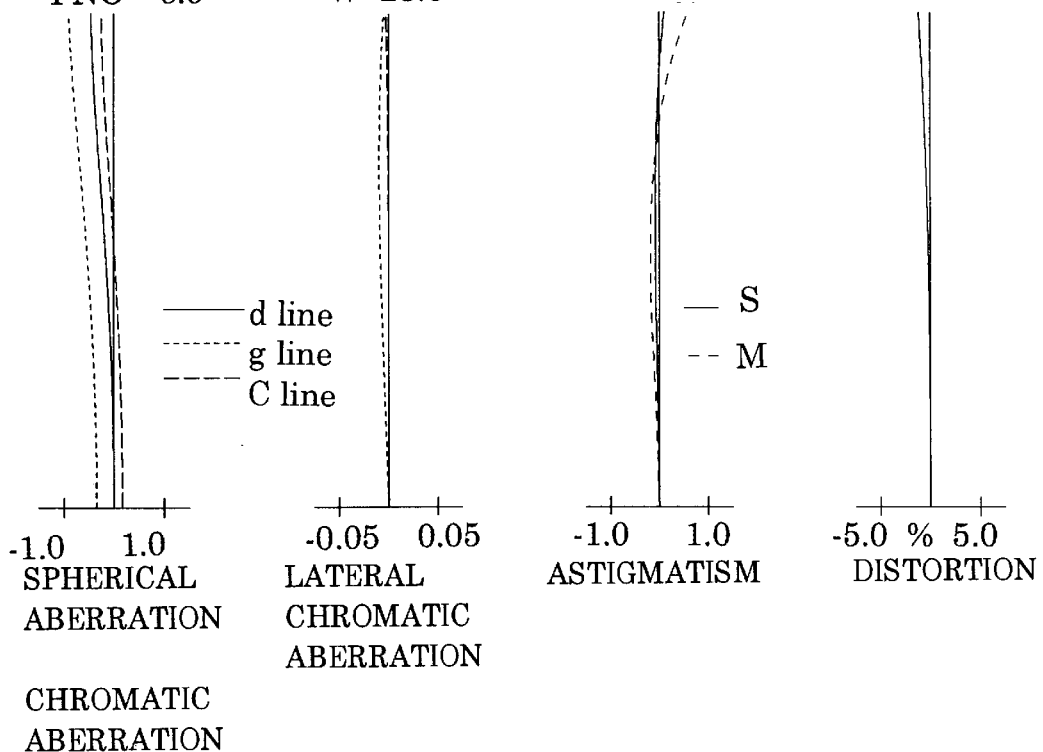
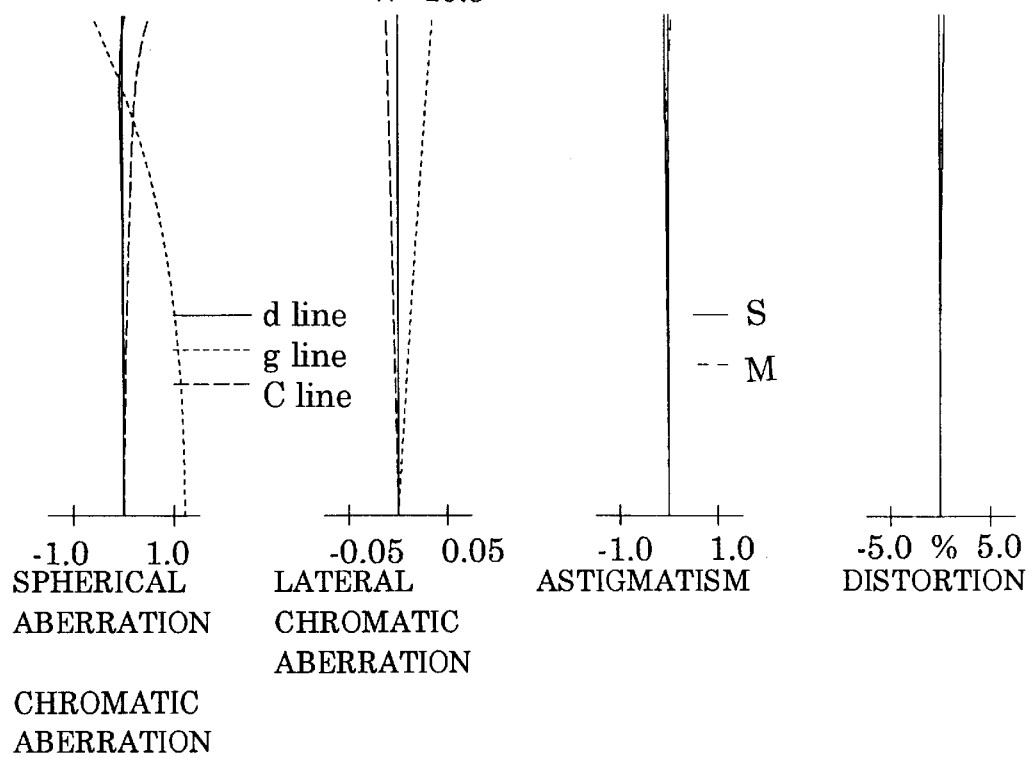

Fig. 12A  Fig. 12B  Fig. 12C  Fig. 12D
FNO=5.2  Y=21.64  Y=21.64  Y=21.64

—— d line
----- g line
---- C line

— S
-- M

-1.0  1.0      -0.05  0.05      -1.0  1.0      -5.0 %  5.0
SPHERICAL      LATERAL         ASTIGMATISM    DISTORTION
ABERRATION     CHROMATIC
               ABERRATION
CHROMATIC
ABERRATION

Fig. 13A  Fig. 13B  Fig. 13C  Fig. 13D
FNO=6.9  Y=21.64  Y=21.64  Y=21.64

—— d line
----- g line
---- C line

— S
-- M

-1.0  1.0      -0.05  0.05      -1.0  1.0      -5.0 %  5.0
SPHERICAL      LATERAL         ASTIGMATISM    DISTORTION
ABERRATION     CHROMATIC
               ABERRATION
CHROMATIC
ABERRATION

Fig. 14A
FNO=12.0
Fig. 14B
Y=21.64
Fig. 14C
Y=21.64
Fig. 14D
Y=21.64
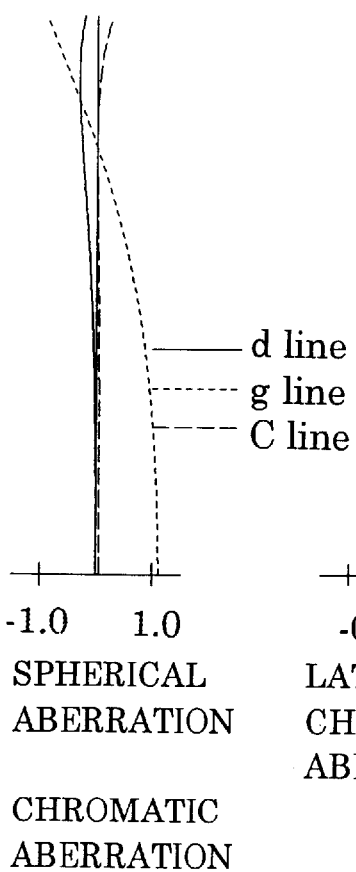
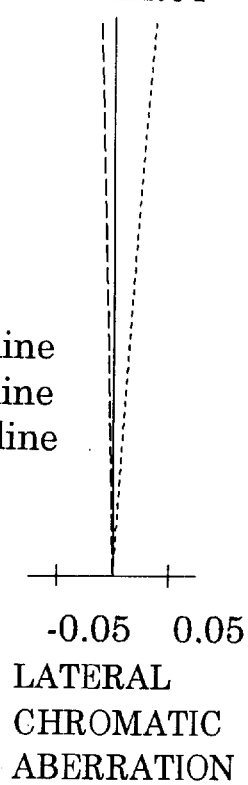
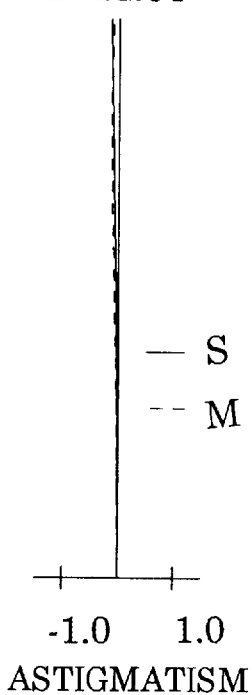
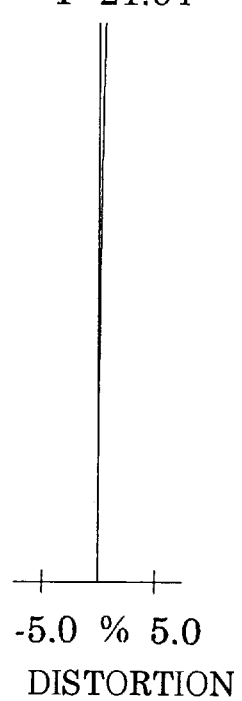
—— d line
----- g line
--- C line
— S
-- M
-1.0   1.0
SPHERICAL
ABERRATION
CHROMATIC
ABERRATION
-0.05   0.05
LATERAL
CHROMATIC
ABERRATION
-1.0   1.0
ASTIGMATISM
-5.0 % 5.0
DISTORTION

FNO=5.2  W=36.4°  W=36.4°  W=36.4°

—— d line
------ g line
---- C line

— S
-- M

-1.0  1.0     -0.05  0.05    -1.0  1.0    -5.0 %  5.0

SPHERICAL    LATERAL       ASTIGMATISM   DISTORTION
ABERRATION   CHROMATIC
             ABERRATION
CHROMATIC
ABERRATION

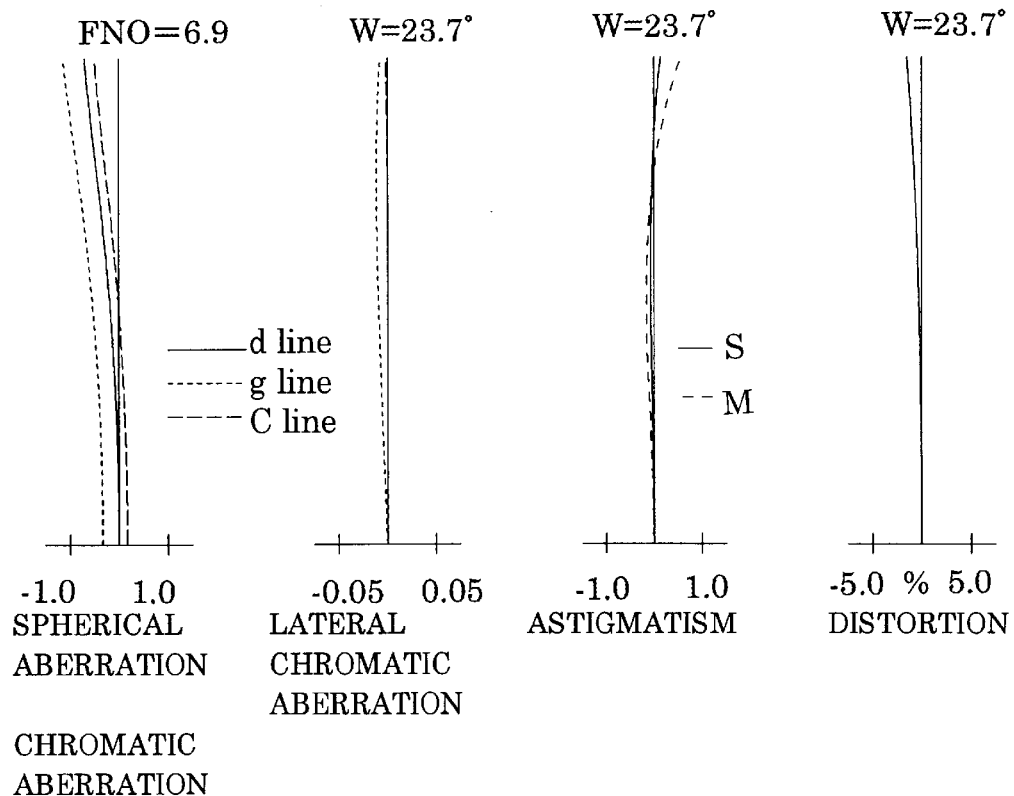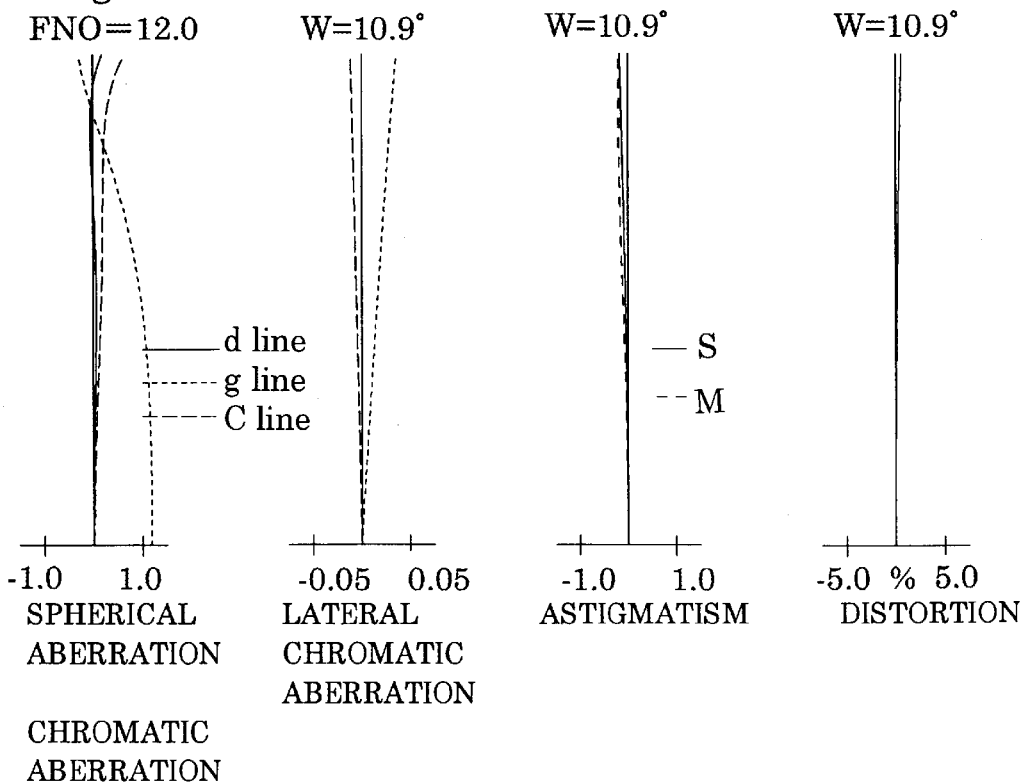

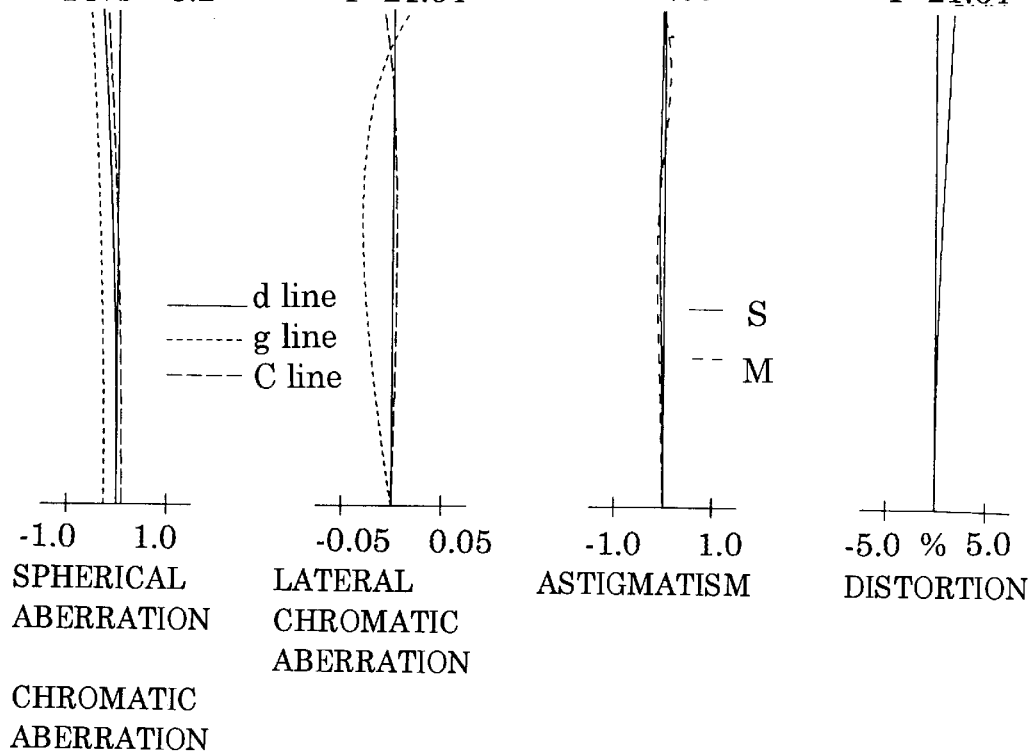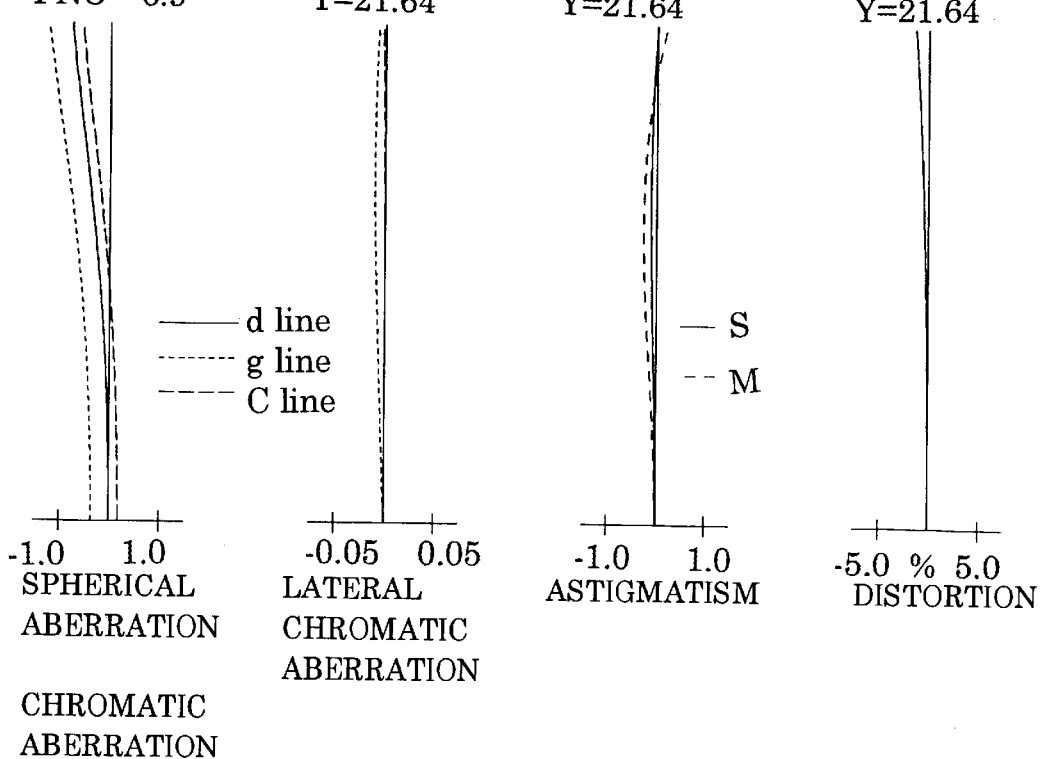

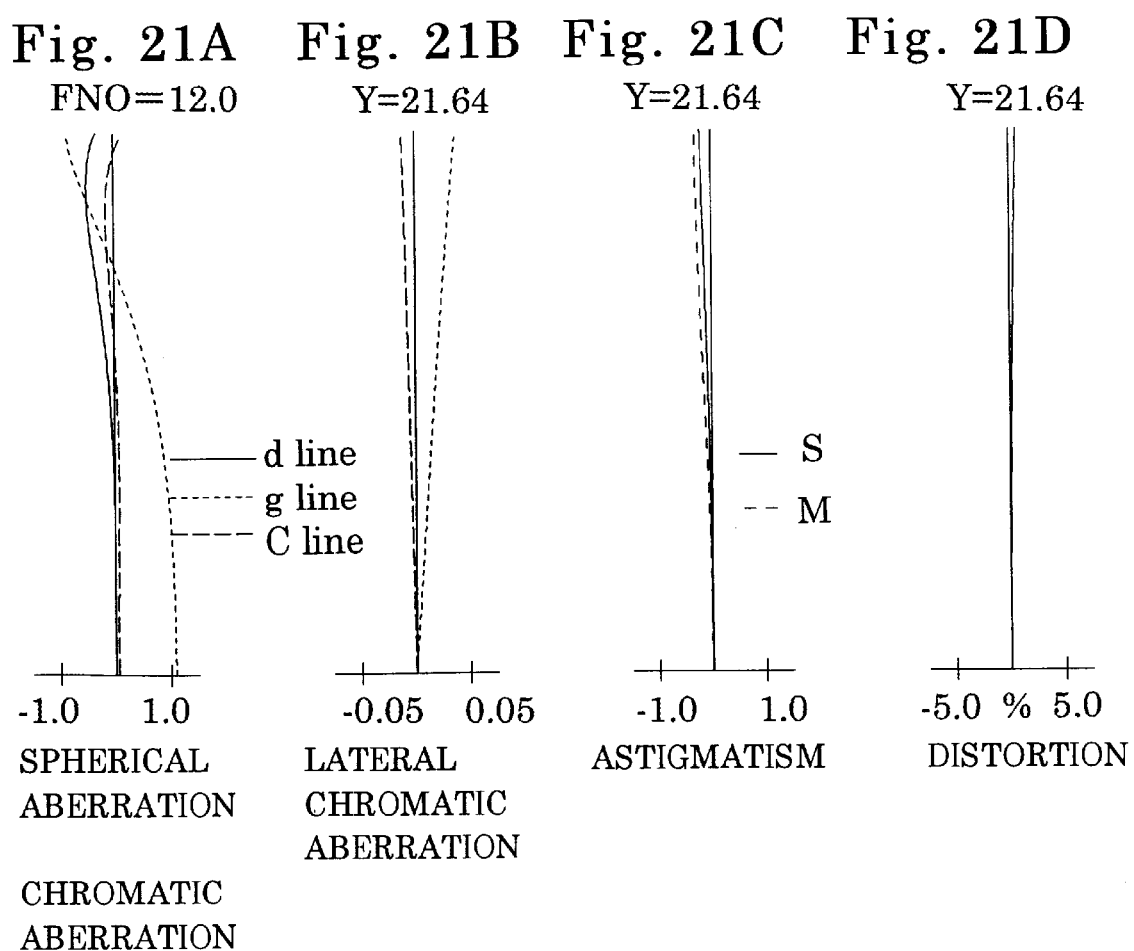

ZOOM LENS SYSTEM AND A FOCUSING METHOD THEREOF

BACKGROUND OF THE INVENTION

1. Field of the Invention

The present invention relates to a zoom lens system for a compact camera, and in particular, relates to a focusing operation thereof.

2. Description of the Related Art

In a zoom lens system for a compact camera, there is no need to provide a long back focal distance, unlike a zoom lens system for a single lens reflex (SLR) camera which requires a space for providing a mirror behind the photographing lens system. Accordingly, a compact camera generally employs a telephoto type lens system in which positive and negative lens groups are provided in this order from the object, while a SLR camera generally employs a retrofocus type lens system in which negative and positive lens groups are provided in this order from the object.

In a compact camera employing a telephoto type lens system, there has been a demand, in recent years, for a higher zoom ratio in a zoom lens system. In order to respond to this demand, a three-lens-group zoom lens system has been frequently employed. In such a three-lens-group zoom lens system, the three lens groups independently move along the optical axis upon zooming. On the other hand, focusing is performed by moving one of the lens groups, usually the first or second lens group, along the optical axis. In order to attain miniaturization of the three-lens-group zoom lens system, reducing the overall length, the lens diameters thereof, and the thickness of the lens groups are all important factors. However, if the number of lens elements is decreased in order to reduce the thicknesses of the lens groups, the number of lens elements constituting a focusing lens group is decreased accordingly. As a result, it becomes difficult to suitably correct aberrations from infinity to the closest photographing position with respect to any focal length points in an entire zooming range determined by the short focal length extremity and the long focal length extremity. This tendency becomes more remarkable when the zoom ratio is set higher. In order to correct aberrations suitably from infinity to the closest photographing position, the number of lens elements in the focusing lens group has to be increased, and therefore miniaturization of the three-lens-group zoom lens system cannot be achieved.

SUMMARY OF THE INVENTION

It is an object of the present invention to provide a miniaturized zoom lens system having a three-lens-group telephoto type lens system, with a small number of lens elements, which can suitably correct aberrations.

In the present invention, by integrally moving the first and second lens groups upon focusing, the number of lens elements constituting a lens group substantially performing an focusing operation is increased, whereby the correcting of aberrations from infinity to the closest photographing position becomes easier. This feature is unlike any well-known technology for focusing, i.e., only one lens group is arranged to perform focusing in a zoom lens system including a negative first lens group, a positive second lens group, and a negative third lens group, in this order from the object, while zooming is performed by moving the first through third lens groups along the optical axis.

According to the present invention, there is provided a zoom lens system including a negative first lens group, a positive second lens group, and a negative third lens group, in this order from the object, and thereby upon zooming, the three lens groups independently move along the optical axis. On the other hand, upon focusing, the first and second lens groups, which move independently upon zooming, move integrally along the optical axis.

The zoom lens system preferably satisfies the following condition:

$$1 < f_{FT}/f_{FW} < 1.5 \qquad (1)$$

wherein $f_{FT}$ designates the resultant focal length of the first lens group and the second lens group (a focusing lens group) at the long focal length extremity; and $f_{FW}$ designates the resultant focal length of the first lens group and the second lens group (the focusing lens group) at the short focal length extremity.

The zoom lens system preferably satisfies the following condition:

$$20 < K_F < 40 \qquad (2)$$

wherein $$K_F = (f_T/f_{FT})^2$$

$f_T$ designates the focal length of the entire zoom lens system at the long focal length extremity; and $f_{FT}$ designates the resultant focal length of the first lens group and the second lens group (a focusing lens group) at the long focal length extremity.

Preferably, the first lens group includes two lens elements, and the second lens group includes three lens elements, and thereby, with a small number of the lens elements, aberrations can be suitably corrected from infinity to the closest photographing position.

Further, according to the present invention, there is provided a focusing method for a zoom lens system including a negative first lens group, a positive second lens group and a negative third lens group, in this order from the object, wherein the method includes:

(i) independently moving the first, second and third lens groups along the optical axis upon zooming; and (ii) integrally moving the first lens group and the second lens group along the optical axis upon focusing.

The present disclosure relates to subject matter contained in Japanese Patent Application No. Hei-10-368174 (filed on Dec. 24, 1998) which is expressly incorporated herein by reference in its entirety.

BRIEF DESCRIPTION OF THE DRAWINGS

The invention will be discussed below in detail with reference to the accompanying drawings, in which:

FIGS. 3A, 3B, 3C and 3D show aberration diagrams of the lens arrangement of FIG. 1 at an intermediate focal length, and the zoom lens system is focused at an infinite object distance;

FIGS. 4A, 4B, 4C and 4D show aberration diagrams of the lens arrangement of FIG. 1 at the long focal length extremity, and the zoom lens system is focused at an infinite object distance;

FIGS. 5A, 5B, 5C and 5D show aberration diagrams of the lens arrangement of FIG. 1 at the short focal length extremity, and the zoom lens system is focused at a finite object distance;

FIGS. 6A, 6B, 6C and 6D show aberration diagrams of the lens arrangement of FIG. 1 at an intermediate focal length, and the zoom lens system is focused at a finite object distance;

FIGS. 7A, 7B, 7C and 7D show aberration diagrams of the lens arrangement of FIG. 1 at the long focal length extremity, and the zoom lens system is focused at a finite object distance;

FIGS 10A, 10B, 10C and 10D show aberration diagrams of the lens arrangement of FIG. 8 at an intermediate focal length, and the zoom lens system is focused at an infinite object distance;

FIGS. 11A, 11B, 11C and 11D show aberration diagrams of the lens arrangement of FIG. 8 at the long focal length extremity, and the zoom lens system is focused at an infinite object distance;

FIGS. 12A, 12B, 12C and 12D show aberration diagrams of the lens arrangement of FIG. 8 at the short focal length extremity, and the zoom lens system is focused at a finite object distance;

FIGS. 13A, 13B, 13C and 13D show aberration diagrams of the lens arrangement of FIG. 8 at an intermediate focal length, and the zoom lens system is focused at a finite object distance;

FIGS. 14A, 14B, 14C and 14D show aberration diagrams of the lens arrangement of FIG. 8 at the long focal length extremity, and the zoom lens system is focused at a finite object distance;

FIGS. 17A, 17B, 17C and 17D show aberration diagrams of the lens arrangement of FIG. 15 at an intermediate focal length, and the zoom lens system is focused at an infinite object distance;

FIGS. 18A, 18B, 18C and 18D show aberration diagrams of the lens arrangement of FIG. 15 at the long focal length extremity, and the zoom lens system is focused at an infinite object distance;

FIGS. 19A, 19B, 19C and 19D show aberration diagrams of the lens arrangement of FIG. 15 at the short focal length extremity, and the zoom lens system is focused at a finite object distance;

FIGS. 20A, 20B, 20C and 20D show aberration diagrams of the lens arrangement of FIG. 15 at an intermediate focal length, and the zoom lens system is focused at a finite object distance;

FIGS. 21A, 21B, 21C and 21D show aberration diagrams of the lens arrangement of FIG. 15 at the long focal length extremity, and the zoom lens system is focused at a finite object distance;

DESCRIPTION OF THE PREFERRED EMBODIMENTS

Figure 22:
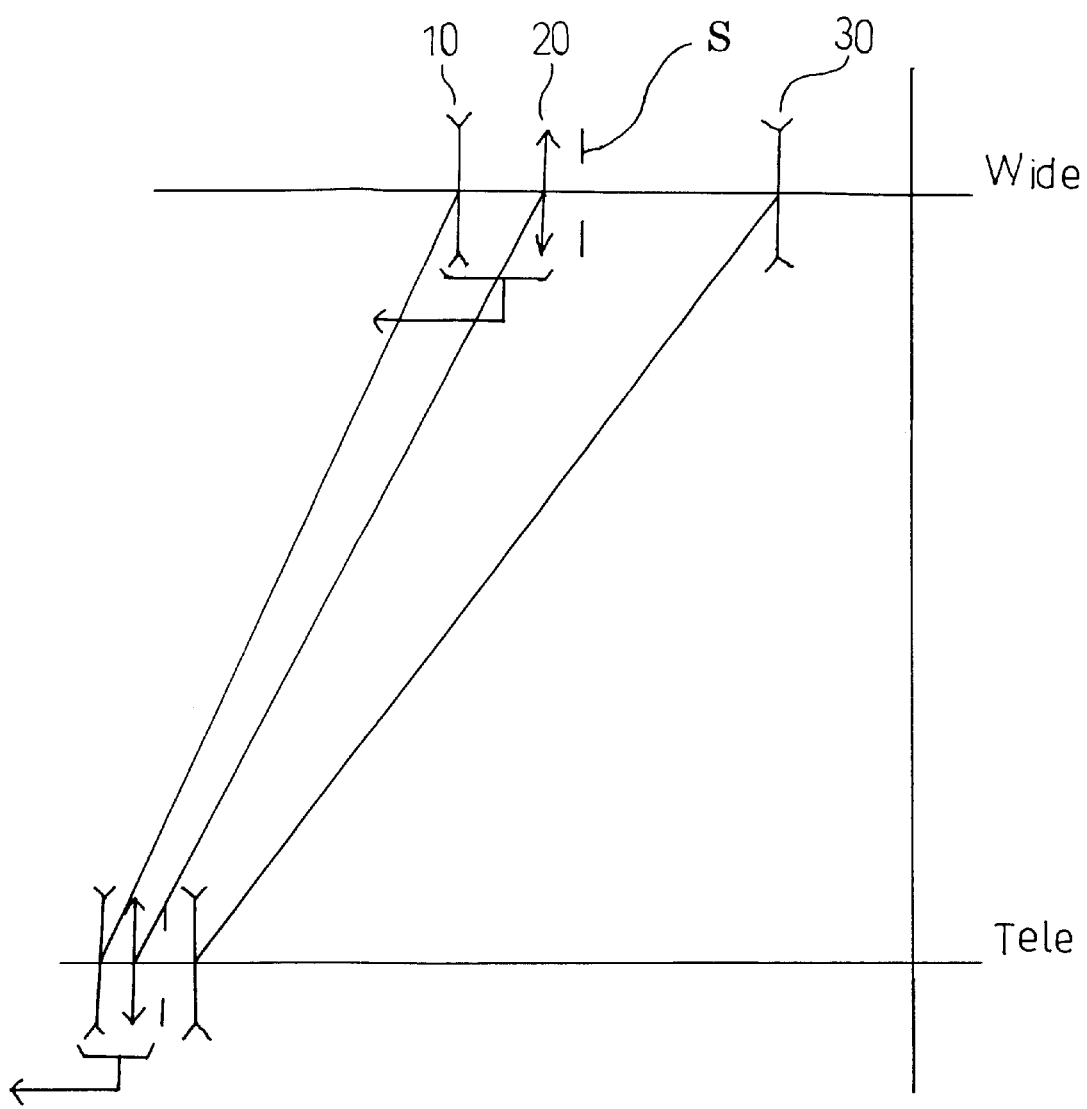
FIG. 22 is the lens-group moving paths of a zoom lens system according to the present invention.

The zoom lens system includes a negative first lens group 10, a positive second lens group 20 and a negative third lens group 30 in this order from the object, as shown in the lens-group moving paths of FIG. 22. In this three-lens-group zoom lens system, upon zooming from the short focal length extremity toward the long focal length extremity, the first, second and third lens groups independently move toward the object while the distance between the first and second lens groups, and the distance between the second and third lens groups are varied. The diaphragm S is provided between the second lens group 20 and the third lens group 30, and moves integrally with the second lens group 20.

In the above described three lens group zoom lens systems, focusing is performed by integrally moving the first and second lens groups 10 and 20. Since the first lens group 10 and the second lens group 20 move independently upon zooming, the distance therebetween varies at different focal length points. When focusing is performed, the first lens group 10 and the second lens group 20 are integrally moved while the distance therebetween at a given focal length position is maintained. By integrally moving the first and second lens groups which independently move upon zooming, even if the number of lens elements for each lens group is small, the number of lens elements constituting a lens group substantially performing an focusing operation is maintained. Therefore the correcting of aberrations from infinity to the closest photographing position becomes easier, compared with a case where only the first or the second lens group is used for focusing. Consequently, opposing requirements, i.e., a higher zoom ratio with suitably-corrected aberrations, and miniaturization of a lens system with smaller number of lens elements, can be satisfied.

Condition (1) specifies a ratio of the focal length of the focusing lens group (the first and second lens groups 10 and 20) at the short focal length extremity to the focal length thereof at the long focal length extremity. By satisfying this condition, the entire length and the diameter of the zoom lens system are reduced, and miniaturization thereof can be achieved.

If $f_{FT}/f_{FW}$ exceeds the upper limit of condition (1), the overall length of the focusing lens group at the short focal length extremity becomes long, and thereby the effective aperture is enlarged, and the length of the entire zoom lens system is made longer.

If $f_{FT}/f_{FW}$ exceeds the lower limit of condition (1), a three-lens-group zoom lens system cannot be achieved.

Condition (2) specifies the sensitivity of the focusing lens group. By satisfying this condition, the traveling distance of the focusing lens group upon focusing is reduced, and miniaturization of the zoom lens system becomes possible.

If $K_F$ exceeds the upper limit of condition (2), the sensitivity of the focusing lens group becomes too high, and it becomes difficult to perform a precise focusing operation.

If $K_F$ exceeds the lower limit of condition (2), the traveling distance of the focusing lens group becomes too long.

Specific numerical examples will herein be discussed. In the diagrams of chromatic aberration (axial chromatic aberration) represented by spherical aberration, the solid lines and the two types of dotted lines respectively indicate spherical aberration with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables, F$_{NO}$ designates the F-number, f designates the focal length of the entire lens system, w designates the half angle-of-view (°), y designates the image height, f$_B$ designates the back focal distance, R designates the radius of curvature, d designates the lens thickness or space between lens surfaces, Nd designates the refractive index with respect to the d line, and v designates the Abbe number.

In addition to the above, an aspherical surface which is symmetrical with respect to the optical axis is defined as follows:

$$x = Ch^2/\{1+[1-(1+K)C^2h^2]^{1/2}\} + A4h^4 + A6h^6 + A8h^8 + A10h^{10}\ldots;$$

wherein:

x designates a distance from a tangent plane of an aspherical vertex;

C designates a curvature of the aspherical vertex (1/R);

h designates a distance from the optical axis;

K designates the conic coefficient;

A4 designates a fourth-order aspherical coefficient;

A6 designates a sixth-order aspherical coefficient;

A8 designates a eighth-order aspherical coefficient; and

A10 designates a tenth-order aspherical coefficient;

EMBODIMENT 1

Figure 1:
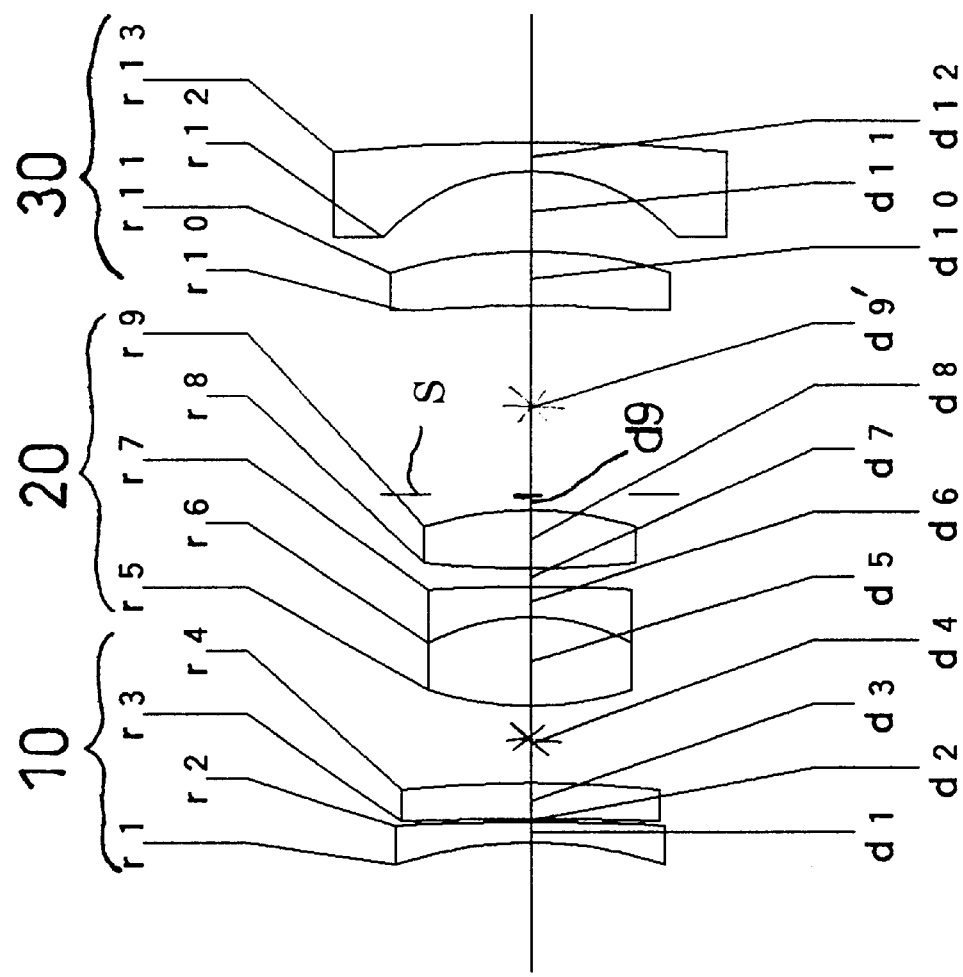
FIG. 1 is a lens arrangement of a first embodiment of a zoom lens system according to the present invention.
Figure 2A:
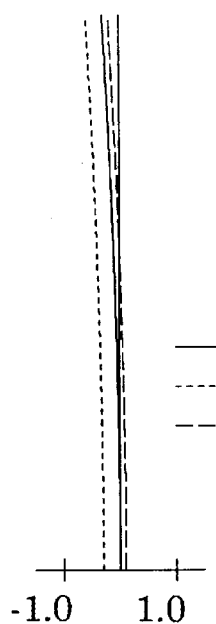
FIGS. 2A, 2B, 2C and 2D show aberration diagrams of the lens arrangement of FIG. 1 at the short focal length extremity, and the zoom lens system is focused at an infinite object distance.
Figure 2B:
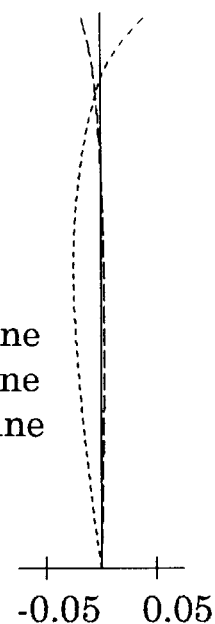
Figure 2C:
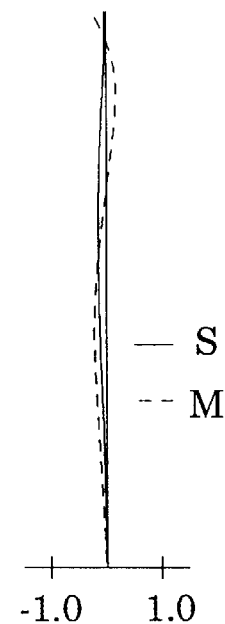
Figure 2D:
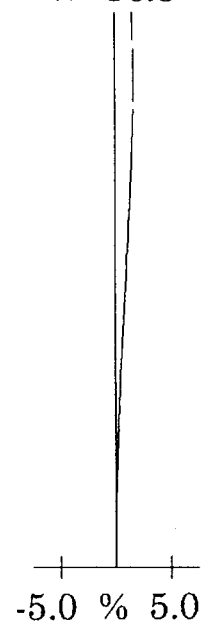

FIGS. 1 through 7 show the first embodiment of the zoom lens system. FIG. 1 is a lens arrangement of the first embodiment. The first lens group 10 includes a negative lens element and a positive lens element, in this order from the object. The second lens group 20 includes a cemented sub lens group having a positive lens element and a negative lens element, and a positive lens element, in this order from the object. The third lens group 30 includes a positive lens element and the negative lens element, in this order from the object. FIGS. 2A through 2D, FIGS. 3A through 3D, and FIGS. 4A through 4D show aberration diagrams of the lens arrangement of FIG. 1, respectively at the short focal length extremity, at an intermediate focal length, and at the long focal length extremity, when the zoom lens system is focused at an infinite object distance. Further, FIGS. 5A through 5D, FIGS. 6A through 6D, and FIGS. 7A through 7D show aberration diagrams of the lens arrangement of FIG. 1, respectively at the short focal length extremity, at an intermediate focal length, and at the long focal length extremity, when the zoom lens system is focused at a finite object distance (an object-image distance: u=2.45 m). Table 1 shows the numerical data thereof. Upon focusing, the first lens group 10 and the second lens group 20 move with respect to the diaphragm S which is made immoveable during a focusing operation. In Table 1, d9 designates the distance between the diaphragm S and the most image-side surface of the second lens group 20. The value of d (indicated by d9' in FIG. 1) corresponding to the diaphragm in Table 1 designates the distance between the diaphragm and the most object-side surface of the third lens group 30. In the second and third embodiments, the above-described distances (d9, d9') are indicated by d8 and d8' respectively.

TABLE 1

F$_{NO}$ = 1:5.2-6.9-12.0
f = 29.00-50.00-112.00 (Zoom Ratio: 3.86)
W = 36.3-23.1-10.9
f$_B$ = 8.68-26.16-73.80

| Surface No. | R | d | Nd | v |
|---|---|---|---|---|
| 1 | −20.254 | 1.00 | 1.78908 | 47.7 |
| 2 | −113.479 | 0.17 | — | — |
| 3 | −132.557 | 1.75 | 1.71567 | 28.8 |
| 4 | −56.804 | 3.73-2.57-0.25 | — | — |
| 5 | 15.941 | 4.35 | 1.48749 | 70.2 |
| 6 | −10.198 | 1.50 | 1.84481 | 35.7 |
| 7 | −90.808 | 0.90 | — | — |
| 8 | 55.452 | 2.83 | 1.73077 | 40.5 |
| 9* | −15.737 | 0.75-0.75-0.75 0.90-0.92-0.94 | (infinite object distance) (finite object distance) | |
| Diaphragm | ∞ | 9.38-5.03-1.99 | — | — |
| 10* | −53.027 | 2.69 | 1.58547 | 29.9 |
| 11 | −22.060 | 3.95 | — | — |
| 12 | −9.350 | 1.40 | 1.80353 | 45.8 |
| 13 | −96.112 | — | — | — |
| Surface | K | A4 | A6 | A8 |
| 9 | 0.00 | 0.6827 × 10$^{-4}$ | −0.2020 × 10$^{-6}$ | 0.4000 × 10$^{-8}$ |
| 10 | 0.00 | 0.7968 × 10$^{-4}$ | −0.1527 × 10$^{-6}$ | 0.1273 × 10$^{-7}$ |

*designates the ashperical surface which is rotationally symmetrical with respect to the optical axis. Aspherical surface data (the aspherical surface coefficients not indicated are zero (0.00)):

EMBODIMENT 2

Figure 8:
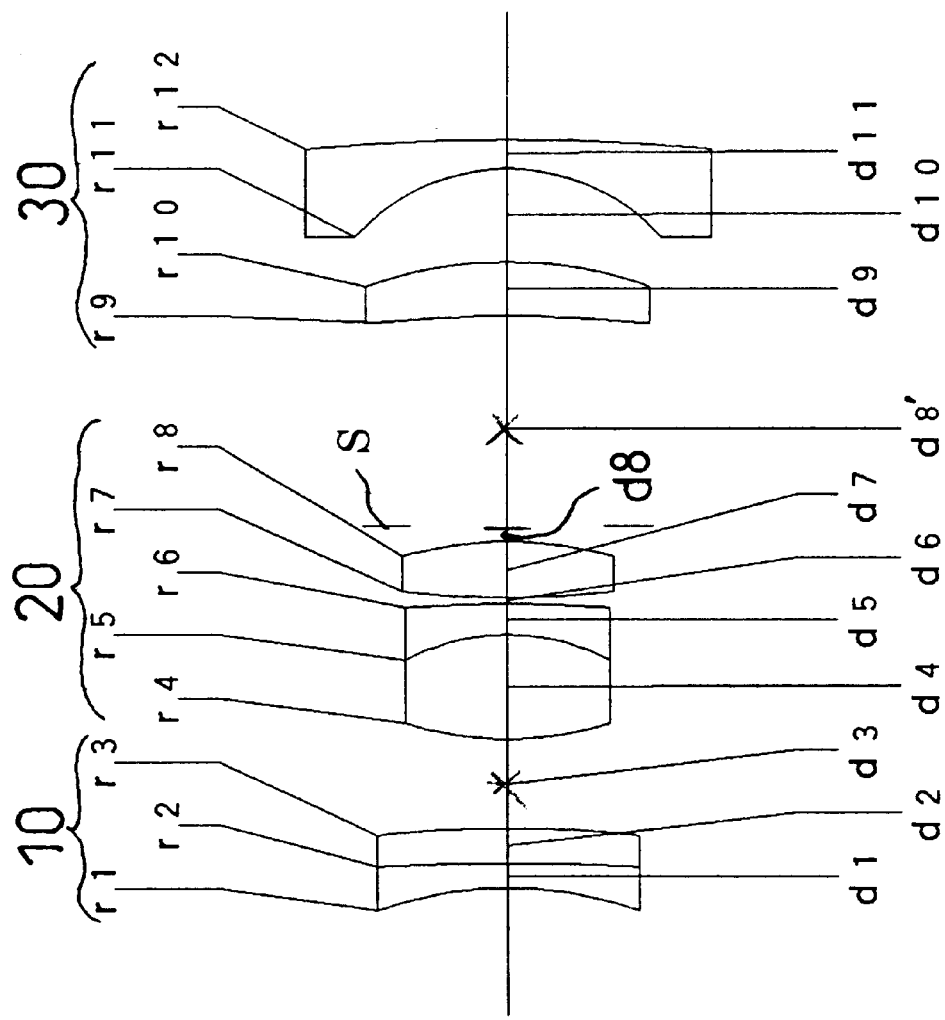
FIG. 8 is a lens arrangement of a second embodiment of a zoom lens system according to the present invention.
Figures 9A, 9B, 9C, 9D:
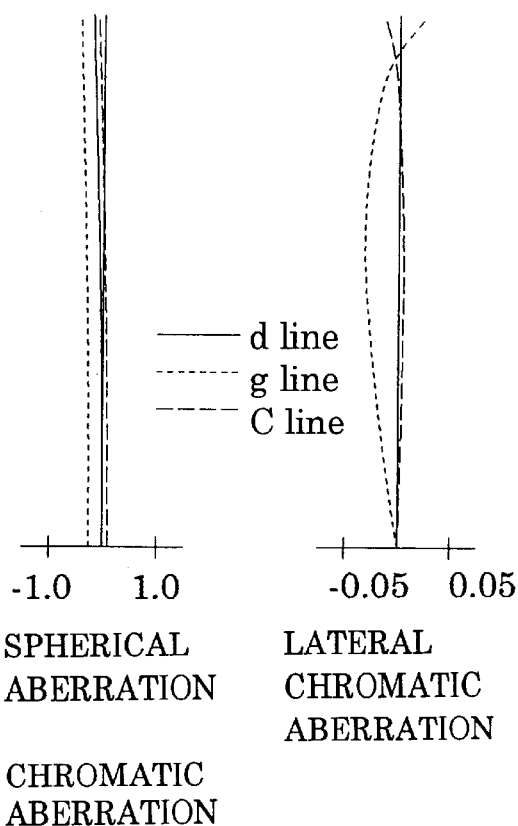
FIGS. 9A, 9B, 9C and 9D show aberration diagrams of the lens arrangement of FIG. 8 at the short focal length extremity, and the zoom lens system is focused at an infinite object distance.

FIGS. 8 through 14 show the second embodiment of the zoom lens system. FIG. 8 is a lens arrangement of the second embodiment. FIGS. 9A through 9D, FIGS. 10A through 10D, and FIGS. 11A through 11D show aberration diagrams of the lens arrangement of FIG. 8, respectively at the short focal length extremity, at an intermediate focal length, and at the long focal length extremity, when the zoom lens system is focused at an infinite object distance. Further, FIGS. 12A through 12D, FIGS. 13A through 13D, and FIGS. 14A through 14D show aberration diagrams of the lens arrangement of FIG. 8, respectively at the short focal length extremity, at an intermediate focal length, and at the long focal length extremity, when the zoom lens system is focused at a finite object distance (an object-image distance: u=2.45 m). Table 2 shows the numerical data thereof. The basic lens arrangement is the same as the first embodiment.

TABLE 2

F$_{NO}$ = 1:5.2-6.9-12.0
f = 29.00-50.00-112.00 (Zoom Ratio: 3.86)
W = 36.4-23.6-10.9
f$_B$ = 8.32-28.52-74.49

| Surface No. | R | d | Nd | v |
|---|---|---|---|---|
| 1 | 18.886 | 1.20 | 1.77000 | 50.3 |
| 2 | −123.486 | 1.75 | 1.70719 | 29.2 |
| 3 | −60.439 | 4.38-4.38-0.55 | — | — |
| 4 | 16.324 | 5.18 | 1.48749 | 70.2 |
| 5 | −10.533 | 1.50 | 1.84493 | 35.1 |
| 6 | −69.448 | 0.32 | — | — |
| 7 | 48.921 | 2.83 | 1.73077 | 40.5 |
| 8* | −18.149 | 0.75-0.75-0.75 0.93-0.93-0.99 | (infinite object distance) (finite object distance) | |
| Diaphragm | ∞ | 10.46-4.59-2.05 | — | — |

TABLE 2-continued $F_{NO}$ = 1:5.2-6.9-12.0
f = 29.00-50.00-112.00 (Zoom Ratio: 3.86)
W = 36.4-23.6-10.9
$f_B$ = 8.32-28.52-74.49

| Surface | | | | |
|---|---|---|---|---|
| 9* | −47.122 | 2.69 | 1.58547 | 29.9 |
| 10 | −21.031 | 4.69 | — | — |
| 11 | −10.077 | 1.40 | 1.78912 | 47.5 |
| 12 | −104.909 | — | — | — |
| Surface | K | A4 | A6 | A8 |
| 1 | 0.00 | $0.8282 \times 10^{-5}$ | $0.6651 \times 10^{-7}$ | — |
| 8 | 0.00 | $0.5770 \times 10^{-4}$ | $-0.1493 \times 10^{-6}$ | $0.1853 \times 10^{-8}$ |
| 9 | 0.00 | $0.4728 \times 10^{-4}$ | $-0.1333 \times 10^{-6}$ | $0.5892 \times 10^{-8}$ |

*designates the aspherical surface which is rotationally symmetrical with respect to the optical axis. Aspherical surface data (the aspherical surface coefficients not indicated are zero (0.00)):

EMBODIMENT 3

Figure 15:
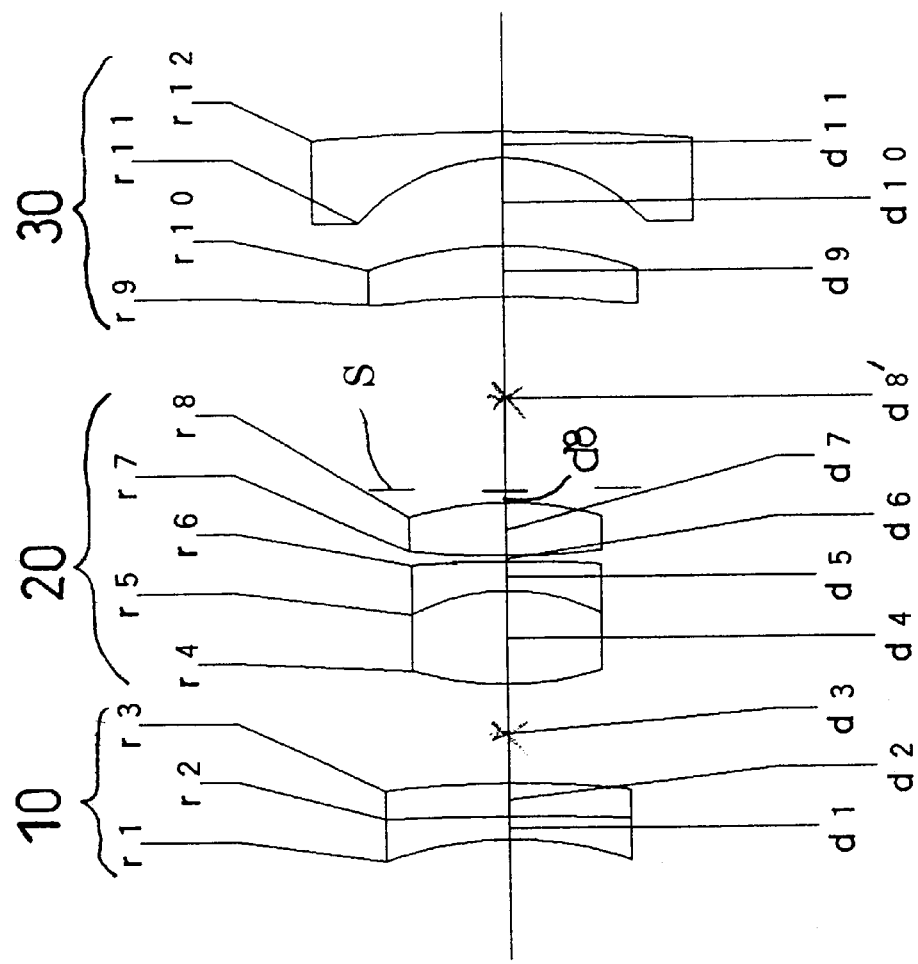
FIG. 15 is a lens arrangement of a third embodiment of a zoom lens system according to the present invention.
Figure 16A:
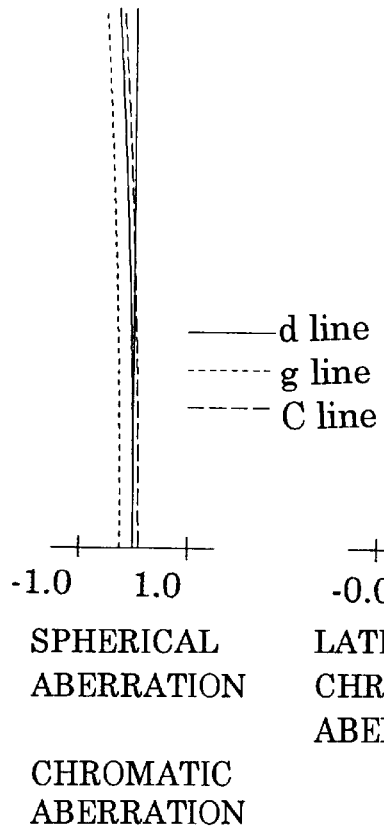
FIGS. 16A, 16B, 16C and 16D show aberration diagrams of the lens arrangement of FIG. 15 at the short focal length extremity, and the zoom lens system is focused at an infinite object distance.
Figure 16B:
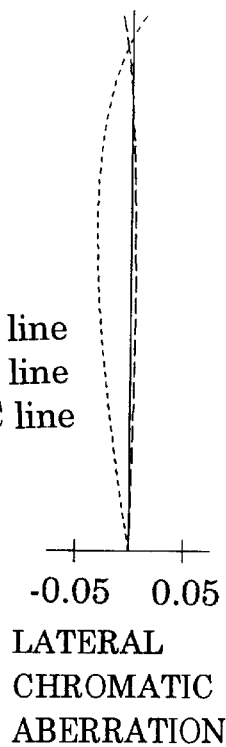
Figure 16C:
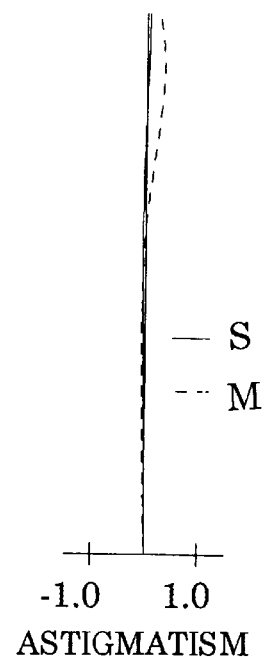
Figure 16D:
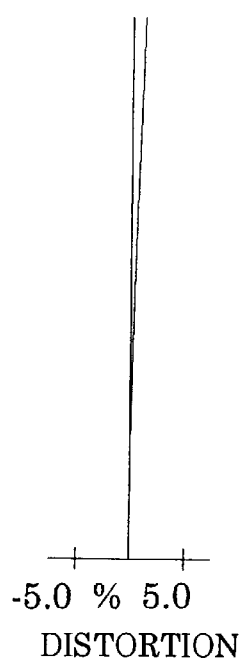

FIGS. 15 through 21 show the third embodiment of the zoom lens system. FIG. 15 is a lens arrangement of the third embodiment. FIGS. 16A through 16D, FIGS. 17A through 17D, and FIGS. 18A through 18D show aberration diagrams of the lens arrangement of FIG. 15, respectively at the short focal length extremity, at an intermediate focal length, and at the long focal length extremity, when the zoom lens system is focused at an infinite object distance. Further, FIGS. 19A through 19D, FIGS. 20A through 20D, and FIGS. 21A through 21D show aberration diagrams of the lens arrangement of FIG. 15, respectively at the short focal length extremity, at an intermediate focal length, and at the long focal length extremity, when the zoom lens system is focused at a finite object distance (an object-image distance: u=2.45 m). Table 3 shows the numerical data thereof. The basic lens arrangement is the same as the first embodiment.

TABLE 3

$F_{NO}$ = 1:5.2-6.9-12.0
f = 29.00-50.00-112.00 (Zoom Ratio: 3.86)
W = 36.4-23.7-10.9
$f_B$ = 8.62-29.10-74.04

| Surface No. | R | d | Nd | ν |
|---|---|---|---|---|
| 1 | −19.455 | 1.20 | 1.77082 | 50.1 |
| 2 | −150.393 | 1.75 | 1.70294 | 29.3 |
| 3 | −60.304 | 5.20-5.26-0.73 | — | — |
| 4 | 16.257 | 5.00 | 1.48749 | 70.2 |
| 5 | −10.402 | 1.50 | 1.84500 | 55.1 |
| 6 | −71.269 | 0.30 | — | — |
| 7 | 49.720 | 2.83 | 1.73077 | 40.5 |
| 8* | −18.240 | 0.75-0.75-0.75 (infinite object distance) 0.92-0.92-0.99 (finite object distance) | | |
| Diaphragm | ∞ | 10.19-4.35-2.06 | — | — |
| 9* | −46.596 | 2.69 | 1.58547 | 29.9 |
| 10 | −20.932 | 4.74 | — | — |
| 11 | −10.149 | 1.40 | 1.78440 | 48.0 |
| 12 | −121.513 | — | — | — |
| Surface No. | K | A4 | A6 | A8 |
| 1 | 0.00 | $0.7341 \times 10^{-5}$ | $0.7306 \times 10^{-7}$ | — |
| 8 | 0.00 | $0.5051 \times 10^{-4}$ | $-0.1980 \times 10^{-6}$ | $0.2653 \times 10^{-8}$ |
| 9 | 0.00 | $0.3781 \times 10^{-4}$ | $-0.2031 \times 10^{-6}$ | $0.6358 \times 10^{-8}$ |

*designates the aspherical surface which is rotationally symmetrical with respect to the optical axis. Aspherical surface data (the aspherical surface coefficients not indicated are zero (0.00)):

Table 4 shows the numerical values of each condition in each embodiment.

TABLE 4

| | Embodiment 1 | Embodiment 2 | Embodiment 3 |
|---|---|---|---|
| Condition (1) | 1.11 | 1.15 | 1.16 |
| Condition (2) | 27.73 | 29.76 | 30.73 |

As can be understood from Table 4, each embodiment satisfies each condition. Furthermore, the various aberrations are relatively well suppressed.

According to the above description, a miniaturized zoom lens system constituted by a three-lens-group telephoto type lens system, with a small number of lens elements, which can suitably correct aberrations, can be obtained.

What is claimed is:

1. A zoom lens system comprising a negative first lens group, a positive second lens group, and a negative third lens group, in this order from an object;

wherein upon zooming, said first, second and third lens groups independently move along the optical axis of said zoom lens system; and wherein said first and second lens groups, which move independently upon zooming, move integrally along the optical axis upon focusing, wherein said zoom lens system satisfies the following condition:

$$1 < f_{FT}/f_{FW} < 1.5$$

wherein $f_{FT}$ designates the resultant focal length of said first lens group and said second lens group at the long focal length extremity; and $f_{FW}$ designates the resultant focal length of said first lens group and said second lens group at the short focal length extremity.

2. A zoom lens system comprising a negative first lens group, a positive second lens group, and a negative third lens group, in this order from an object;

wherein upon zooming, said first, second and third lens groups independently move along the optical axis of said zoom lens system; and wherein said first and second lens groups, which move independently upon zooming, move integrally along the optical axis upon focusing, wherein said zoom lens system satisfies the following condition:

$$20 < K_F < 40$$

wherein $$K_F = (f_T/f_{FT})^2$$

$f_T$ designates the focal length of the entire zoom lens system at the long focal length extremity; and $f_{FT}$ designates the resultant focal length of said first lens group and said second lens group at the long focal length extremity.

3. A zoom lens system comprising a negative first lens group, a positive second lens group, and a negative third lens group, in this order from an object;

wherein upon zooming, said first, second and third lens groups independently move along the optical axis of said zoom lens system; and wherein said first and second lens groups, which move independently upon zooming, move integrally along the optical axis upon focusing, wherein said first lens group comprises two lens elements, and said second lens group comprises three lens elements.

4. A focusing method for a zoom lens system, said zoom lens system comprising a negative first lens group, a positive second lens group and a negative third lens group, in this order from the object, said method comprising:
   (i) independently moving said first, second and third lens groups along the optical axis upon zooming; and
   (ii) integrally moving said first lens group and said second lens group along the optical axis upon focusing, wherein said zoom lens system satisfies the following condition:

$$1 < f_{FT}/f_{FW} < 1.5$$

wherein
   $f_{FT}$ designates the resultant focal length of said first lens group and said second lens group at the long focal length extremity; and
   $f_{FW}$ designates the resultant focal length of said first lens group and said second lens group at the short focal length extremity.

5. A focusing method for a zoom lens system said zoom lens system comprising a negative first lens group, a positive second lens group and a negative third lens group, in this order from the object, said method comprising:
   (i) independently moving said first, second and third lens groups along the optical axis upon zooming; and
   (ii) integrally moving said first lens group and said second lens group along the optical axis upon focusing, wherein said zoom lens system satisfies the following condition:

$$20 < K_F < 40$$

wherein $$K_F = (f_T/f_{FT})^2$$

$f_T$ designates the focal length of the entire zoom lens system at the long focal length extremity; and
   $f_{FT}$ designates the resultant focal length of said first lens group and said second lens group at the long focal length extremity.

6. A focusing method for a zoom lens system said zoom lens system comprising a negative first lens group, a positive second lens group and a negative third lens group, in this order from the object, said method comprising:
   (i) independently moving said first, second and third lens groups along the optical axis upon zooming; and
   (ii) integrally moving said first lens group and said second lens group along the optical axis upon focusing, wherein said first lens group comprises two lens elements, and said second lens group comprises three lens elements.

* * * * *